US012188696B2

(12) United States Patent
Kim et al.

(10) Patent No.: US 12,188,696 B2
(45) Date of Patent: Jan. 7, 2025

(54) AIR CONDITIONER

(71) Applicant: LG ELECTRONICS INC., Seoul (KR)

(72) Inventors: Byungsoon Kim, Seoul (KR); Sanghun Lee, Seoul (KR); Ingon Kim, Seoul (KR); Jongchul Choi, Seoul (KR); Hongsuk Jin, Seoul (KR); Taeseung Yoon, Seoul (KR); Yongjin Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 17/162,190

(22) Filed: Jan. 29, 2021

(65) Prior Publication Data
US 2021/0239377 A1 Aug. 5, 2021

(30) Foreign Application Priority Data

Jan. 31, 2020 (KR) .................. 10-2020-0011695

(51) Int. Cl.
*F25B 41/20* (2021.01)
*F25B 13/00* (2006.01)

(52) U.S. Cl.
CPC .............. *F25B 41/20* (2021.01); *F25B 13/00* (2013.01)

(58) Field of Classification Search
CPC ... F25B 13/00; F25B 41/20; F24F 3/06; F24F 3/065; F24F 3/08; F24F 3/10; F24F 1/0035; F24F 1/0038
See application file for complete search history.

(56) References Cited

U.S. PATENT DOCUMENTS

| 2010/0242521 A1* | 9/2010 | Narikawa .............. F24F 3/1411 |
| | | 62/271 |
| 2011/0192189 A1 | 8/2011 | Morimoto et al. |
| 2016/0238290 A1* | 8/2016 | Bae .................. F25B 41/20 |
| 2020/0011549 A1* | 1/2020 | Spargo .................. F24F 3/147 |

FOREIGN PATENT DOCUMENTS

| CN | 205316557 U | * | 6/2016 |
| JP | 2010-107152 A | | 5/2010 |
| KR | 20110120070 A | * | 11/2011 |

(Continued)

OTHER PUBLICATIONS

CN-205316557-U English Translation (Year: 2016).*

(Continued)

*Primary Examiner* — David J Teitelbaum
*Assistant Examiner* — Devon Moore
(74) *Attorney, Agent, or Firm* — Birch, Stewart, Kolasch & Birch, LLP

(57) ABSTRACT

An air conditioner includes an outdoor unit including a compressor for compressing a refrigerant and an outdoor heat exchanger for exchanging heat between the refrigerant and outside air. A ventilation device is connected to a plurality of refrigerant pipes, and configured to direct outside air into an indoor space, and indoor air to the outside. The ventilation device includes a case, a main heat exchanger, a recovery heat exchanger, and a refrigerant distributor. The refrigerant distributor is configured to direct the refrigerant between the main heat exchanger and the recovery heat exchanger.

17 Claims, 8 Drawing Sheets

(56) References Cited

FOREIGN PATENT DOCUMENTS

| KR | 10-2019-0041092 | 4/2019 |
| WO | WO 2014/206012 A1 | 12/2014 |
| WO | WO 2019/058540 A1 | 3/2019 |

OTHER PUBLICATIONS

JP-2010107152-A English Translation (Year: 2010).*
WO 2014206012 English Translation (Year: 2014).*
KR-20110120070-A English Translation (Year: 2011).*
International Search Report mailed May 7, 2021 in International Application No. PCT/KR2021/001238.

* cited by examiner

AIR CONDITIONER

BACKGROUND

1. Technical Field

The present disclosure relates to an air conditioner, and more particularly, to an air conditioner including a ventilation device for heat-exchanging air by using a refrigerant.

2. Description of the Related Art

In the case of an indoor unit that adjusts the temperature of an indoor space by circulating indoor air, only stagnant air in the indoor space is circulated. Therefore, there is a problem in that it is not possible to continuously provide comfortable air to a user.

Therefore, a ventilation device that can continuously introduce fresh outside air into an indoor space, by introducing outside air and discharging indoor air, may be used.

In the case of a ventilation device, the temperature of the air supplied to the indoor may be adjusted through heat exchange between the indoor air discharged to the outside and the outside air supplied to the indoor, or air flowing into the inside may be heated by installing an additional heater.

Korean patent application No. 1020150122092 discloses a ventilation system based on a dedicated outside air system, and discloses a content of supplying air introduced from the outdoors into the indoor through heat exchange between outside air and indoor air. In addition, outside air is flowed into the indoor space through dehumidification using a liquid dehumidifying agent. In this structure, since outside air supplied to the indoor cannot be provided at a temperature desired by a user, it is difficult to properly control the temperature of the indoor space.

In addition, Korean patent application No. 10-2010-0039582 discloses the content of supplying the air introduced from the outdoors to the indoor through a separate cooling coil. In the case of controlling the temperature of the flowing air by using a cooling coil that consumes separate power, there is a problem in that energy efficiency is deteriorated as a large amount of power is consumed.

SUMMARY

The present disclosure has been made in view of the above problems, and provides an air conditioner that minimizes power consumption for temperature control of air supplied to the indoor through a system in which refrigerant flows, in a ventilation system that discharges indoor air to the outside and supplies outside air to the indoor.

The present disclosure further provides an air conditioner that maximizes heat exchange efficiency caused by the driving of a compressor, in a ventilation device in which a plurality of separate heat exchangers are disposed.

The present disclosure further provides an air conditioner capable of accomplishing detailed temperature control of air supplied to the indoor, in a ventilation device in which a plurality of separate heat exchangers are disposed.

In order to achieve the above object, the air conditioner according to the present disclosure includes: an outdoor unit including a compressor for compressing a refrigerant and an outdoor heat exchanger for exchanging heat between the refrigerant and outside air; and a ventilation device which is connected to a plurality of refrigerant pipes, flows the outside air into an indoor space, and flows indoor air to the outside. The ventilation device includes: a case in which a supply flow path through which the outside air is introduced into a room and a discharge flow path through which the indoor air is discharged to the outside are formed therein; a main heat exchanger which is disposed in the supply flow path, and exchanges heat between flowing air and refrigerant; a recovery heat exchanger which is disposed in the discharge flow path, and exchanges heat between flowing air and refrigerant; and a refrigerant distributor which is connected to the plurality of refrigerant pipes, and supplies the refrigerant introduced from the outdoor unit to each of the main heat exchanger and the recovery heat exchanger, or supplies the refrigerant flowing from each of the main heat exchanger and the recovery heat exchanger to the outdoor unit, so that the air supplied to the room can be cooled or heated, while the air discharged to the outside can be heated or cooled. The refrigerant distributor sends the refrigerant introduced from the main heat exchanger to the recovery heat exchanger, or sends the refrigerant introduced from the recovery heat exchanger to the main heat exchanger, so that the main heat exchanger and the recovery heat exchanger can perform heat exchange in opposite ways to each other.

The recovery heat exchanger heats the air flowing through the discharge flow path, when the main heat exchanger cools the air flowing through the supply flow path, and the recovery heat exchanger cools the air flowing through the discharge flow path, when the main heat exchanger heats the air flowing through the supply flow path, so that when the main heat exchanger and the recovery heat exchanger operate with a single outdoor unit, they can be used as condensers or evaporators at the same time.

The recovery heat exchanger has a smaller area than the main heat exchanger, so that a main control can be performed to control the temperature of the air supplied to the room.

The air conditioner further includes a total heat exchanger which is disposed across the supply flow path and the discharge flow path, and heat-exchanges between the air flowing through the supply flow path and the air flowing through the discharge flow path by rotation, and the recovery heat exchanger is disposed downstream of the total heat exchanger in the discharge flow path, so that the indoor air and the outside air are first heat-exchanged with each other, and the flowing air is heat-exchanged with the recovery heat exchanger. Similarly, the main heat exchanger is disposed downstream of the total heat exchanger, in the supply flow path, so that after heat exchange is achieved between outside air and indoor air, air can be heat-exchanged by the main heat exchanger.

The air conditioner further includes a re-heat heat exchanger which is disposed in the supply flow path, connected to the refrigerant distributor, and heats the air that passed through the main heat exchanger.

The re-heat heat exchanger is disposed downstream of the main heat exchanger in the supply flow path, so that the air passed through the main heat exchanger can be additionally controlled.

The re-heat heat exchanger heats the flowing air in consideration of a temperature and a relative humidity of the air discharged into the indoor space.

The main heat exchanger cools flowing air with a dew point temperature corresponding to a set temperature and a set humidity, and the re-heat heat exchanger heats the flowing air with the set temperature, so that the air discharged into the room can be precisely controlled.

The air conditioner further includes an auxiliary heat exchanger which is disposed in the supply flow path, connected to the refrigerant distributor, and heats air that passed through the re-heat heat exchanger, so that air temperature can be additionally controlled.

The refrigerant distributor stops a supply of refrigerant to the auxiliary heat exchanger, when the main heat exchanger cools the air flowing through the supply flow path, so that unnecessary refrigerant flow can be prevented.

The plurality of refrigerant pipes include a liquid refrigerant pipe connected to the outdoor heat exchanger disposed inside the outdoor unit; a high-pressure refrigerant pipe through which the refrigerant compressed by the compressor flows; and a low-pressure refrigerant pipe for sending a refrigerant to the compressor.

The refrigerant distributor includes a liquid refrigerant header connected to the liquid refrigerant pipe; a high-pressure refrigerant header connected to the high-pressure refrigerant pipe; and a low-pressure refrigerant header connected to the low-pressure refrigerant pipe.

The refrigerant flows from the liquid refrigerant header to the recovery heat exchanger, when the refrigerant flows from the main heat exchanger to the liquid refrigerant header, and the refrigerant flows from the liquid refrigerant header to the main heat exchanger, when the refrigerant flows from the recovery heat exchanger to the liquid refrigerant header, so that when cooling the air by the main heat exchanger, the air can be heated by the recovery heat exchanger.

The air conditioner further includes a re-heat heat exchanger which is disposed in the supply flow path, and directly connected to the high-pressure refrigerant pipe to heat air passed through the main heat exchanger, so that refrigerant can be supplied directly from the high-pressure refrigerant pipe to the re-heat heat exchanger.

The air conditioner further includes a first indoor gas pipe connecting the main heat exchanger to each of the high-pressure refrigerant header and the low-pressure refrigerant header; a second indoor gas pipe connecting the recovery heat exchanger to each of the high-pressure refrigerant header and the low-pressure refrigerant header; a first indoor liquid pipe connecting the main heat exchanger and the liquid refrigerant header; and a second indoor liquid pipe connecting the recovery heat exchanger and the liquid refrigerant header.

BRIEF DESCRIPTION OF THE DRAWINGS

The above and other objects, features and advantages of the present disclosure will be more apparent from the following detailed description in conjunction with the accompanying drawings, in which:

FIG. 6A is a diagram illustrating a flow of a refrigerant during a cooling operation, and FIG. 6B is a diagram illustrating a flow of a refrigerant during a heating operation.

DETAILED DESCRIPTION

Figure 1:
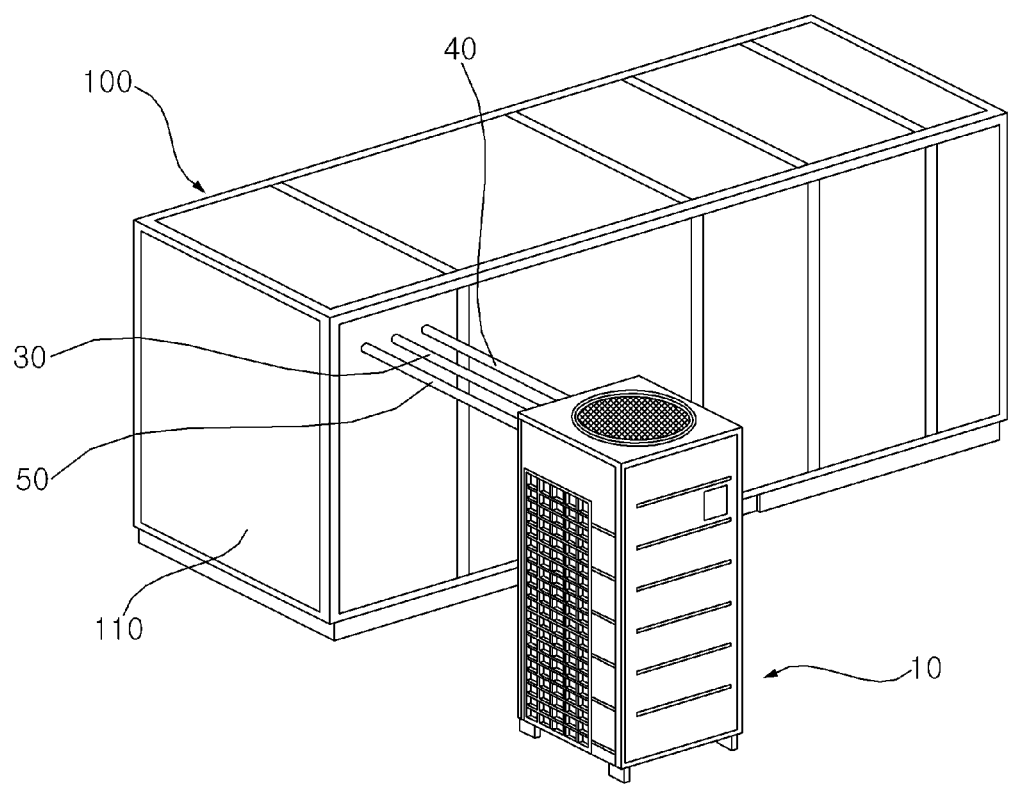
FIG. 1 is a schematic perspective view of an air conditioner including a ventilation device, an outdoor unit, and a plurality of refrigerant pipes according to an embodiment of the present disclosure.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art. The present disclosure is defined only by the scope of the claims. Like reference numerals refer to like elements throughout the specification.

Hereinafter, the present disclosure will be described with reference to the drawings for explaining an air conditioner according to embodiments of the present disclosure.

Overall Configuration

Referring to FIG. 1, the air conditioner of the present disclosure includes an outdoor unit 10 including a compressor 12 for compressing a refrigerant and an outdoor heat exchanger 14 for exchanging the refrigerant and outside air, a ventilation device 100 heat-exchanging indoor air to discharge to the outside and heat-exchanging outside air to supply to the indoor, and a plurality of refrigerant pipes 30, 40, 50 connecting the ventilation device 100 and the outdoor unit 10.

The ventilation device 100 may be a ventilation apparatus that discharges indoor air to an outdoor space and supplies outside air to an indoor space. The ventilation device 100 may heat or cool outside air supplied to the indoor space by disposing a plurality of heat exchangers therein. The ventilation device 100 may exchange heat between outside air and indoor air. The ventilation device 100 may heat-exchange indoor air discharged to the outdoor space and then discharge the indoor air.

The ventilation device 100 includes a refrigerant distributor 150 that transfers refrigerant to each of the plurality of heat exchangers. The ventilation device 100 may supply a liquid refrigerant or a gaseous refrigerant to each of the plurality of heat exchangers disposed therein, through the refrigerant distributor 150. Accordingly, each of the plurality of heat exchangers disposed inside the ventilation device 100 may heat the flowing air and cool the flowing air simultaneously.

The ventilation device 100 may be connected to the outdoor unit 10 through a plurality of refrigerant pipes 30, 40, and 50. The ventilation device 100 may be connected to the outdoor unit 10 through three refrigerant pipes.

The plurality of refrigerant pipes 30, 40, 50 may include a liquid pipe 30 through which a liquid refrigerant flows, a high-pressure refrigerant pipe 40 through which a high-pressure gaseous refrigerant flows, and a low-pressure refrigerant pipe 50 through which a low-pressure gaseous refrigerant flows.

The outdoor unit 10 may compress a refrigerant by a compressor 12 disposed therein, and transfer the compressed refrigerant to the outdoor heat exchanger 14 or to the ventilation device 100.

Ventilation Device

Hereinafter, a ventilation device according to the present disclosure will be described with reference to FIGS. 2 to 5B.

The ventilation device 100 of the present disclosure is installed between an indoor space and an outdoor space, and may allow indoor air to flow outdoors and outside air to flow indoors. The ventilation device 100 of the present disclosure may be a ventilation device that introduces outside air into the indoor and transfers indoor air to the outside.

Figure 2:
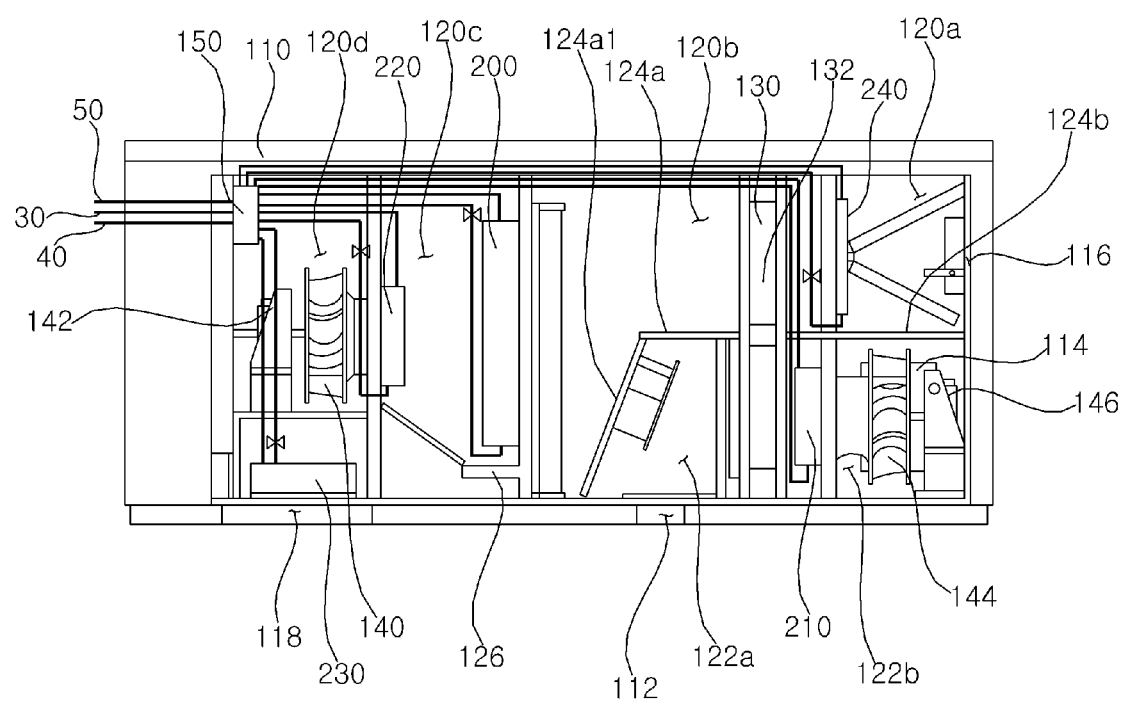
FIG. 2 is a schematic cross-sectional view of a ventilation device according to an embodiment of the present disclosure.
Figure 3:
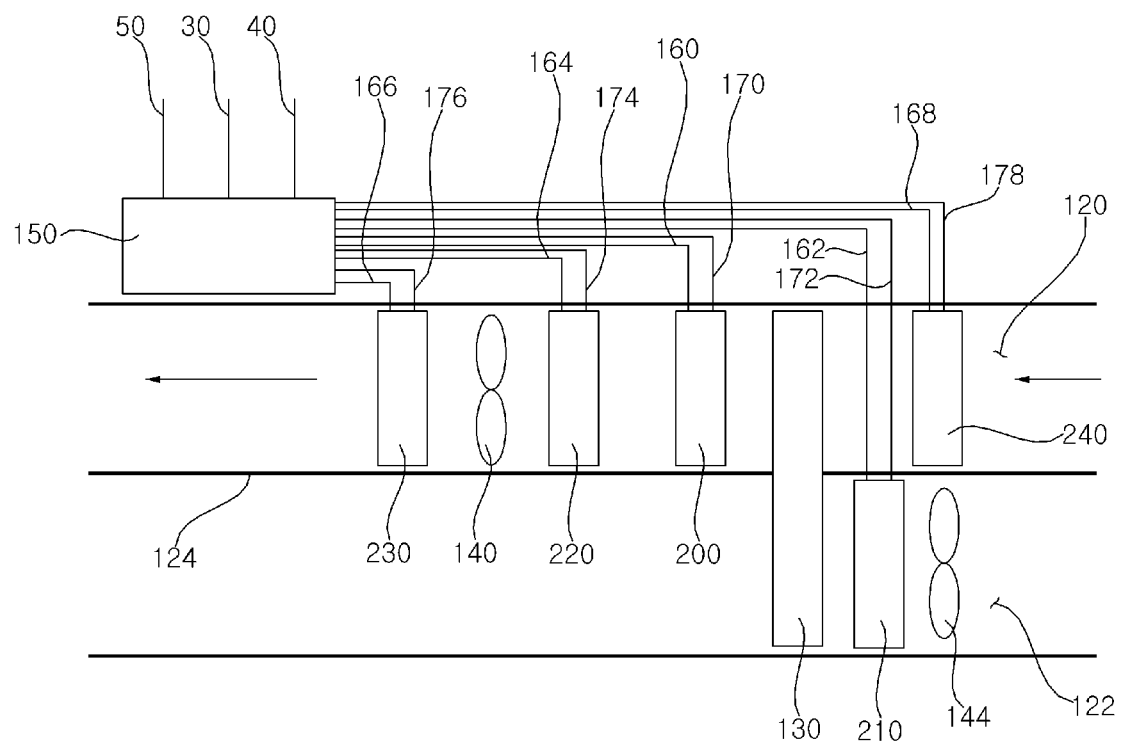
FIG. 3 is a view for explaining the air flowing inside the ventilation device according to an embodiment of the present disclosure.
Figure 4:
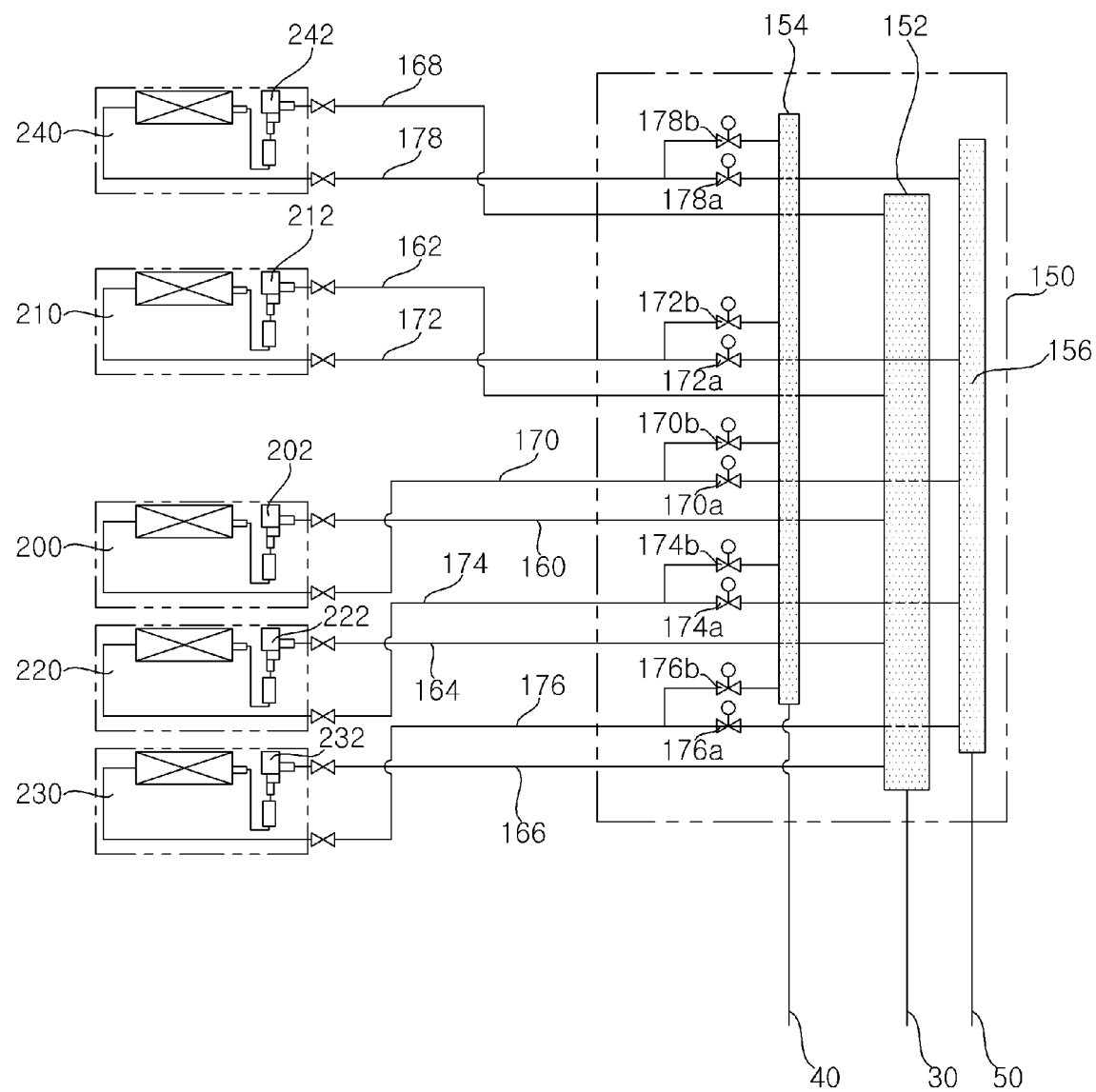
FIG. 4 is a system diagram showing a connection relationship between a heat exchanger and a refrigerant distributor disposed inside a ventilation device according to an embodiment of the present disclosure.

The ventilation device 100 may be connected to the outdoor unit 10 through a plurality of refrigerant pipes 30, 40, and 50. Referring to FIGS. 1 to 3, the ventilation device 100 includes a liquid pipe 30 through which a liquid refrigerant flows, a high-pressure refrigerant pipe 40 through which a high-pressure gaseous refrigerant flows, and a low-pressure refrigerant pipe 50 through which a low-pressure gaseous refrigerant flows, and is connected to the outdoor unit 10.

The ventilation device 100 of the present disclosure includes a supply flow path 120 through which outside air flows therein, a case 110 forming a discharge flow path 122 through which indoor air flows, a partition wall 124 disposed inside the case 110 and separating the supply flow path 120 and the discharge flow path 122, a total heat exchanger 130 disposed inside the case 110 and heat-exchanging the outside air flowing through the supply flow path 120 with the indoor air flowing through the discharge flow path 122, a plurality of heat exchangers 200, 210, 220, 230, 240 disposed in the supply flow path 120 or the discharge flow path 122, and heat-exchanging flowing air with a refrigerant, and a refrigerant distributor 150 flowing the refrigerant flowing from the outdoor unit 10 to at least one of a plurality of heat exchangers 200, 210, 220, 230, 240, and sending the refrigerant flowing from at least one of the plurality of heat exchangers 200, 210, 220, 230, 240 to the outdoor unit 10.

The ventilation device 100 includes a first blowing fan 140 rotatably disposed in the supply flow path 120, a first blowing motor 142 that rotates the first blowing fan 140, a second blowing fan 144 that is rotatably disposed in the discharge flow path 122, and a second blowing motor 146 that rotates the second blowing fan 144.

A plurality of heat exchangers include a main heat exchanger 200 disposed in the supply flow path 120 to heat-exchange the refrigerant with the flowing outside air, a recovery heat exchanger 210 disposed in the discharge flow path 122 to heat-exchange with the flowing indoor air, and a re-heat heat exchanger 220 disposed in the supply flow path and heat-exchanging the refrigerant with the outside air that passed through the main heat exchanger 200. The plurality of heat exchangers may further include an auxiliary heat exchanger 230 disposed in the supply flow path 120 and heat-exchanging the outside air that passed through the re-heat heat exchanger 220. The plurality of heat exchangers may further include a preheat heat exchanger 240 disposed in the supply flow path 120 and preheating the air introduced into an outside air intake port 116.

The case 110 forms a supply flow path 120 and a discharge flow path 122 therein. The case 110 forms a space in which the refrigerant distributor 150 is disposed. The space in which the refrigerant distributor 150 is disposed may be a space separated from the supply flow path 120 and the discharge flow path 122. In addition, the refrigerant distributor 150 may be disposed in one side of the supply flow path 120 or the discharge flow path 122. The refrigerant distributor 150 may be disposed in a position that does not interfere with the flow of air in one side of the supply flow path 120.

The case 110 includes an outside air intake port 116, through which the inside of the case 110 and the outside communicate with each other, that is formed in one side of the supply flow path 120, and an outside air supply port 118, through which the inside of the case 110 and the interior communicate with each other, that is formed in the other side of the supply flow path 120. The case 110 includes an indoor air discharge port 114, through which the inside of the case 110 and the outside communicate with each other, that is formed in one side of the discharge flow path 122, and an indoor air intake port 112, through which the inside of the case 110 and the interior communicate with each other, that is formed in the other side of the discharge flow path 122.

The outside air intake port 116 and the outside air supply port 118 may be disposed in a vertical direction. The indoor air intake port 112 and the indoor air discharge port 114 may be disposed in a vertical direction.

The supply flow path 120 forms a flow path shorter than the discharge flow path 122. Referring to FIG. 2, the supply flow path 120 may form a vertical flow path in the form of an "ᄀ" shape.

The supply flow path 120 may be separated into a first supply flow path 120a formed between the outside air intake port 116 and the total heat exchanger 130, a second supply flow path 120b formed between the total heat exchanger 130 and the main heat exchanger 200, a third supply flow path 120c formed between the main heat exchanger 200 and the re-heat heat exchanger 220, and a fourth supply flow path 120d formed between the re-heat heat exchanger 220 and the outside air supply port 118.

In the first supply flow path 120a, a preheating heat exchanger (not shown) connected to the refrigerant distributor 150, and heating the air flowing into the outside air intake port 116 may be disposed.

In the second supply flow path 120b, the cross-sectional area of the flow path increases as it goes from upstream to downstream in the flow direction of air. The main heat exchanger 200 is disposed in the downstream end of the second supply flow path 120b. The flow velocity of the air flowing through the second supply flow path 120b decreases as it goes downstream, and the flow path expands. Therefore, a large amount of air may be heat-exchanged in the main heat exchanger 200.

A drain pan 126 for temporarily storing condensed water and discharging the condensed water to the outside may be disposed under the main heat exchanger 200.

The third supply flow path 120c has a shape in which the cross-sectional area of the flow path decreases as it goes from upstream to downstream in the flow direction of air. Accordingly, condensed water generated from the air flowing through the third supply flow path 120c may move to the drain pan 126. The air flowing through the third supply flow path 120c may be formed to have a flow speed that becomes faster gradually.

A first blowing fan 140 is disposed in the fourth supply flow path 120d. The fourth supply flow path 120d may form a flow path perpendicular to the third supply flow path 120c. The first blowing fan 140 flows the air that passed through the re-heat heat exchanger 220 to the outside air supply port 118.

The discharge flow path 122 may include a first discharge flow path 122a formed between the indoor air intake port 112 and the total heat exchanger 130, and a second discharge flow path 122b formed between the total heat exchanger 130 and the indoor air discharge port 114.

The second discharge flow path 122b is disposed below the first supply flow path 120a. The first discharge flow path 122a is disposed below the second supply flow path 120b.

The first discharge flow path 122a forms a flow path perpendicular to the second discharge flow path 122b.

A recovery heat exchanger 210 is disposed in the second discharge flow path 122b.

A second blowing fan 144 is disposed in the second discharge flow path 122b to flow air flowing through the discharge flow path 122 to the indoor air discharge port 114.

A partition wall 124 that separates the supply flow path 120 and the discharge flow path 122 is disposed inside the case 110.

The partition wall 124 includes a first partition wall 124a partitioning between the second supply flow path 120b and the first discharge flow path 122a, and a second partition wall 124b partitioning between the first supply flow path 120a and the second discharge flow path 122b.

The second partition wall 124b may have a horizontal plate shape that partitions the first supply flow path 120a and the second discharge flow path 122b. The first partition wall 124a may include an inclined surface 124a1 for expanding the cross-sectional area of the second supply flow path 120b.

The total heat exchanger 130 is an apparatus for recovering sensible heat and latent heat by using a temperature difference and a humidity difference between outside air and ventilated air while rotating at a low speed. The total heat exchanger 130 is formed in a cylindrical body shape, and the inside is formed in a honeycomb structure to allow air to pass therethrough.

The total heat exchanger 130 may recover sensible heat and latent heat by using a temperature difference and a humidity difference between outside air and ventilated air while rotating a heat exchanger 132 at a low speed. The heat exchanger 132 is formed of aluminum as a base material and may recover sensible heat by the heat transfer characteristics of aluminum. In addition, aluminum is impregnated with a desiccant, and latent heat may be recovered by the principle of absorption of water vapor.

The total heat exchanger 130 is disposed in both the supply flow path 120 and the discharge flow path 122.

Each of the plurality of heat exchangers 200, 210, 220, 230, 240 is connected to the refrigerant distributor 150 by a plurality of indoor gas pipes 170, 172, 174, 176, 178 and a plurality of indoor liquid pipes 160, 162, 164, 166, 168.

In the supply flow path 120, the main heat exchanger 200 is disposed downstream of the total heat exchanger 130. In the supply flow path 120, the main heat exchanger 200 may be disposed in an enlarged cross-sectional area. The main heat exchanger 200 may exchange heat with air in a larger area than the re-heat heat exchanger 220. The main heat exchanger 200 may be connected to the refrigerant distributor 150 to receive a compressed refrigerant flowing from a high-pressure refrigerant pipe 40 or a liquid refrigerant flowing from a liquid pipe 30.

The recovery heat exchanger 210 is disposed, in the discharge flow path 122, downstream of the total heat exchanger 130. The recovery heat exchanger 210 heats or cools indoor air flowing to the outdoor space through the discharge flow path 122. The recovery heat exchanger 210 may operate opposite to the main heat exchanger 200. Here, the opposite operation may mean that heat exchanges for heating or cooling air are performed differently. That is, it may mean that when the main heat exchanger 200 cools the air flowing through the supply flow path 120, the recovery heat exchanger 210 heats the air flowing through the discharge flow path 122, and when the main heat exchanger 200 heats air flowing through the supply flow path 120, the recovery heat exchanger 210 cools the air flowing through the discharge flow path 122.

The recovery heat exchanger 210 may be disposed, in the discharge flow path 122, upstream of the second blowing fan 144.

The re-heat heat exchanger 220 is disposed, in the supply flow path 120, downstream of the main heat exchanger 200. The re-heat heat exchanger 220 may be disposed in an inlet end of the first blowing fan 140. Accordingly, the re-heat heat exchanger 220 may heat air flowing into the inlet end of the first blowing fan 140. The re-heat heat exchanger 220 may be connected to the refrigerant distributor 150 to receive the refrigerant discharged from the compressor 12.

The re-heat heat exchanger 220 may heat the flowing air in consideration of the temperature and relative humidity of the air discharged into the indoor space. The re-heat heat exchanger 220 and the main heat exchanger 200 may control the temperature and relative humidity of air discharged to the indoor space.

That is, in consideration of the temperature (hereinafter, "set temperature) and humidity (hereinafter, "set humidity)" set by a user, the re-heat heat exchanger 220 and the main heat exchanger 200 may be operated. First, the main heat exchanger 200 cools the air to a dew point temperature corresponding to the set temperature and set humidity, and the re-heat heat exchanger 220 heats the air to a discharge temperature range, so that air may be discharged with the temperature and humidity range set by a user.

In addition, in another embodiment, the re-heat heat exchanger 220 may be directly connected to the high-pressure refrigerant pipe 40 to receive the refrigerant discharged from the compressor 12. At this time, the re-heat heat exchanger 220 is connected to the high-pressure refrigerant pipe 40 to receive and heat-exchange a high-pressure gas refrigerant flowing through the high-pressure refrigerant pipe 40. In this case, the re-heat heat exchanger 220 is directly connected to the refrigerant distributor 150, or connected to the first indoor liquid pipe 160 connecting the main heat exchanger 200 and the refrigerant distributor 150, so that the refrigerant heat-exchanged in the re-heat heat exchanger 220 may be supplied to the refrigerant distributor 150.

The auxiliary heat exchanger 230 is disposed downstream of the re-heat heat exchanger 220, in the supply flow path 120. The auxiliary heat exchanger 230 is disposed at the discharge end of the supply flow path 120 to heat the air discharged to the outside air supply port 118. The auxiliary heat exchanger 230 may be disposed in the outside air supply port 118.

The preheat heat exchanger 240 is disposed upstream of the total heat exchanger 130, in the supply flow path 120. The preheat heat exchanger 240 is disposed at the suction end of the supply flow path 120 to heat the air introduced from the outside air intake port 116. The preheat heat exchanger 240 may be disposed in the first supply flow path 120a.

The refrigerant distributor 150 is connected to the outdoor unit 10 and connected to each of the plurality of heat exchangers 200, 210, 220, 230, 240. The refrigerant distributor 150 is connected to the outdoor unit 10 through the liquid pipe 30, the high-pressure refrigerant pipe 40, and the low-pressure refrigerant pipe 50.

The refrigerant distributor 150 is disposed inside the case 110. The refrigerant distributor 150 is connected to each of a plurality of heat exchangers 200, 210, 220, 230, 240 which are disposed inside the ventilation device 100, through a plurality of indoor gas pipes 170, 172, 174, 176, 178 and a plurality of indoor liquid pipes 160, 162, 164, 166, 168. The plurality of indoor gas pipes may include a first indoor gas pipe 170 connected to the main heat exchanger 200, a second indoor gas pipe 172 connected to the recovery heat exchanger 210, and a third indoor gas pipe 173 connected to the re-heat heat exchanger 220. The plurality of indoor gas pipes may further include a fourth indoor gas pipe 176 connected to the auxiliary heat exchanger 230, and a fifth indoor gas pipe 178 connected to the preheat heat exchanger 240.

Each of the plurality of indoor gas pipes 170, 172, 174, 176, 178 is branched inside the refrigerant distributor 150 and connected to a high-pressure refrigerant header 154 and a low-pressure refrigerant header 156. Control valves 170a, 170b, 172a, 172b, 174a, 174b, 176a, 176b, 178a, 178b for controlling the flow of refrigerant are disposed in each of a plurality of branched indoor gas pipes 170, 172, 174, 176, 178.

The plurality of indoor liquid pipes may include a first indoor liquid pipe 160 connected to the main heat exchanger 200, a second indoor liquid pipe 162 connected to the recovery heat exchanger 210, and a third indoor liquid pipe 164 connected to the re-heat heat exchanger 220. The plurality of indoor liquid pipes may further include a fourth indoor liquid pipe 166 connected to the auxiliary heat exchanger 230, and a fifth indoor liquid pipe 168 connected to the preheat heat exchanger 240. Indoor heat exchanger expansion valves 202, 212, 222, 232, 242 may be disposed in each of the plurality of indoor liquid pipes 160, 162, 164, 166, 168. Accordingly, the indoor heat exchanger expansion valves 202, 212, 222, 232, 242 disposed in each of the plurality of indoor liquid pipes 160, 162, 164, 166, 168 may expand the refrigerant flowing through each of the plurality of indoor liquid pipes 160, 162, 164, 166, 168.

The refrigerant distributor 150 is connected to the main heat exchanger 200 through the first indoor liquid pipe 160 and the first indoor gas pipe 170. The refrigerant distributor 150 is connected to the recovery heat exchanger 210 through the second indoor liquid pipe 162 and the second indoor gas pipe 172. The refrigerant distributor 150 is connected to the re-heat heat exchanger 210 through the third indoor liquid pipe 164 and the third indoor gas pipe 174.

The refrigerant distributor 150 includes a liquid refrigerant header 152 connecting the liquid pipe 30 and each of the plurality of heat exchangers 200, 210, 220, 230, 240, a high-pressure refrigerant header 154 connecting the high-pressure refrigerant pipe 40 and each of the plurality of heat exchangers 200, 210, 220, 230, 240, and a low-pressure refrigerant header 156 connecting the low-pressure refrigerant pipe 50 and each of the plurality of heat exchangers 200, 210, 220, 230, 240.

The liquid refrigerant header 152 connects the liquid pipe 30 and each of the plurality of indoor liquid pipes 160, 162, 164, 166, 168. The high-pressure refrigerant header 154 connects the high-pressure refrigerant pipe 40 and each of the plurality of indoor gas pipes 170, 172, 174, 176, 178. The low-pressure refrigerant header 156 connects the low-pressure refrigerant pipe 50 and each of the plurality of indoor gas pipes 170, 172, 174, 176, 178.

Outdoor Unit

Hereinafter, the configuration of the outdoor unit of the present disclosure will be described with reference to FIGS. 6A to 6B.

The outdoor unit 10 includes a compressor 12 for compressing a refrigerant, an outdoor heat exchanger 14 which is disposed inside the outdoor unit 10 and exchanges heat between a refrigerant and an outside air, a first switching valve 18 that transfers the refrigerant discharged from the compressor 12 to the ventilation device 100 or transfers the refrigerant supplied from the ventilation device 100 to the compressor 12, and a second switching valve 20 that transfers the refrigerant discharged from the compressor 12 to the outdoor heat exchanger 14 or transfers the refrigerant introduced from the outdoor heat exchanger 14 to the compressor 12.

A compressor discharge pipe through which the refrigerant discharged from the compressor 12 flows is branched and connected to each of the first switching valve 18 and the second switching valve 20.

The first switching valve 18 is connected to the compressor 12, the low-pressure refrigerant pipe 50, and the high-pressure refrigerant pipe 40. The second switching valve 20 is connected to the compressor 12, the outdoor heat exchanger 14, and the low-pressure refrigerant pipe 50.

The outdoor unit 10 further includes an outdoor blowing fan 16 which is disposed adjacent to the outdoor heat exchanger 14, and forms a flow of air around the outdoor heat exchanger 14. The outdoor heat exchanger 14 is connected to the liquid pipe 30 and transfers the liquid refrigerant heat-exchanged in the outdoor heat exchanger 14 to the ventilation device 100. The outdoor heat exchanger 14 may receive the liquid refrigerant heat-exchanged in the ventilation device 100 through the liquid pipe 30. The outdoor unit 10 includes an outdoor unit expansion valve 22 which is disposed in the liquid pipe 30 and expands the refrigerant flowing inside the liquid pipe 30.

The outdoor unit 10 is connected to the ventilation device 100 by the liquid pipe 30, the high-pressure refrigerant pipe 40, and the low-pressure refrigerant pipe 50. The liquid pipe 30 connects the outdoor heat exchanger 14 and the refrigerant distributor 150 of the ventilation device 100. The high-pressure refrigerant pipe 40 connects the first switching valve 18 and the refrigerant distributor 150. The low-pressure refrigerant pipe 50 connects the second switching valve 20 or the compressor 12 and the refrigerant distributor 150.

Operation

Hereinafter, an operation of the air conditioner of the present disclosure will be described with reference to FIGS. 5A to 6B.

The air conditioner of the present disclosure may perform a cooling operation or a heating operation. The cooling operation and the heating operation may be determined based on the main heat exchanger 200 disposed inside the ventilation device 100. When the air conditioner is in the cooling operation or a heating operation, the first blowing fan 140 and the second blowing fan 144 are operated. When the air conditioner is in the cooling operation or a heating operation, the total heat exchanger 130 rotates, thereby achieving a heat exchange between the air flowing through the supply flow path 120 and the air flowing through the discharge flow path 122.

Figure 6A:
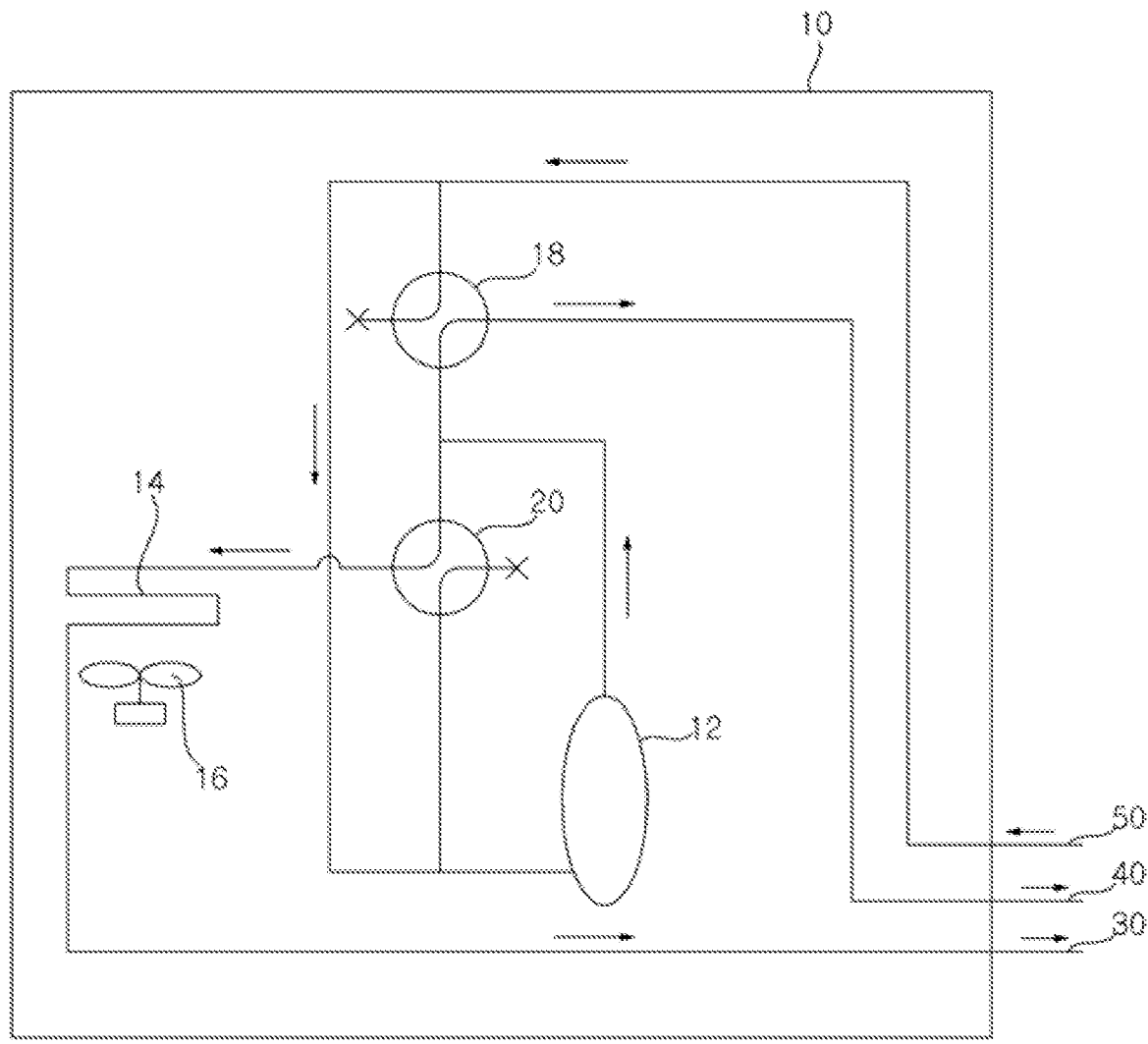
FIGS. 6A and 6B are schematic diagrams illustrating an internal configuration of an outdoor unit according to an embodiment of the present disclosure.

Referring to FIG. 6A, when the air conditioner is in the cooling operation, the refrigerant discharged from the compressor 12 flows into the high-pressure refrigerant pipe 40 through the first switching valve 18. In addition, the refrigerant discharged from the compressor 12 flows to the outdoor heat exchanger 14 through the second switching valve 20. The refrigerant passed through the outdoor heat exchanger 14 flows into the liquid pipe 30. In addition, the refrigerant supplied from the ventilation device 100 through the low-pressure refrigerant pipe 50 flows to the compressor 12.

Figure 6B:
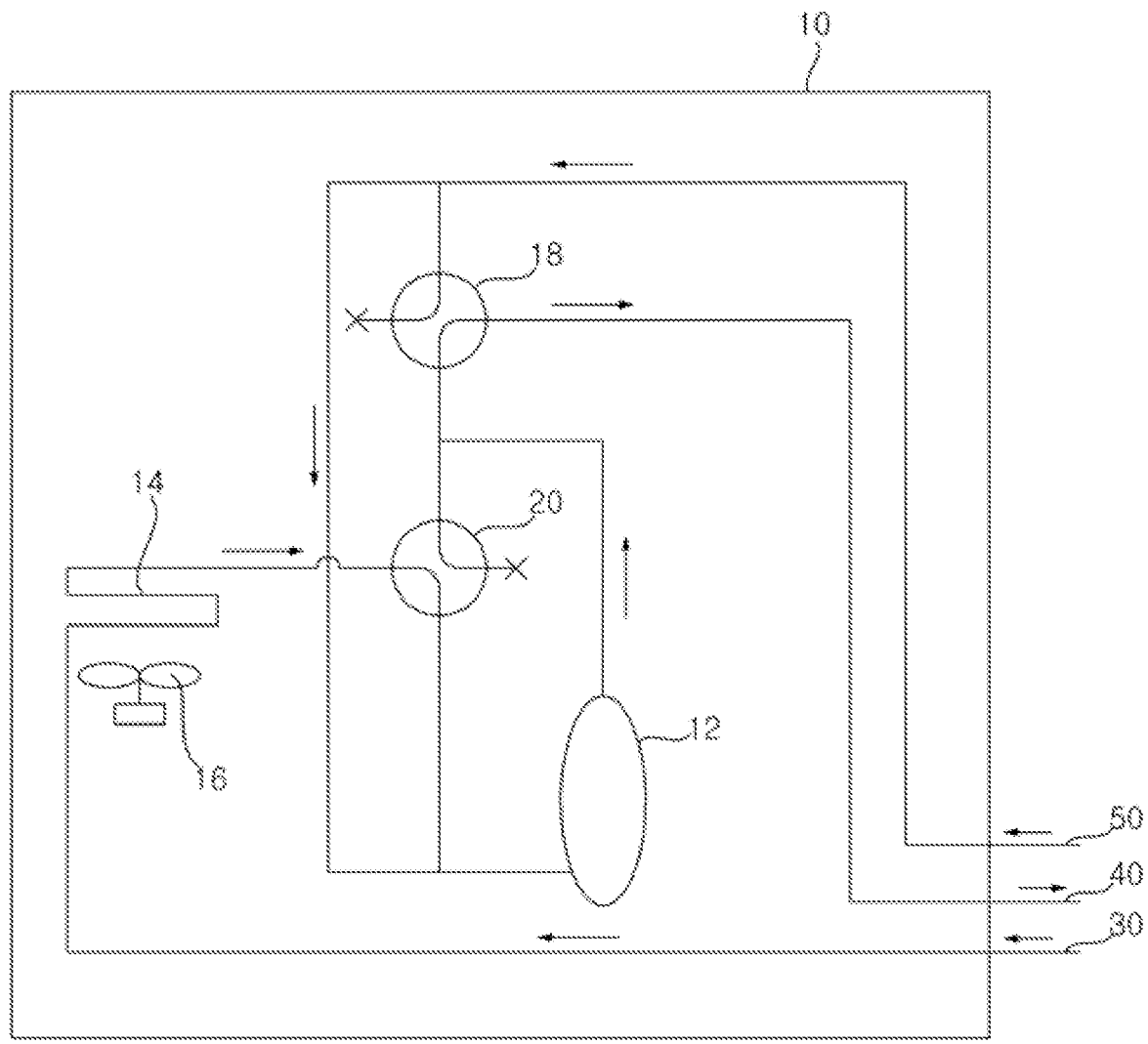

Referring to FIG. 6B, when the air conditioner is in the heating operation, the refrigerant discharged from the compressor 12 flows to the high-pressure refrigerant pipe 40 through the first switching valve 18. The refrigerant supplied from the ventilation device 100 through the low-pressure refrigerant pipe 50 flows to the compressor 12. In addition, the refrigerant supplied from the ventilation device 100 through the liquid pipe 30 flows to the outdoor heat exchanger 14 and is supplied to the compressor 12 through the second switching valve 20.

Figure 5A:
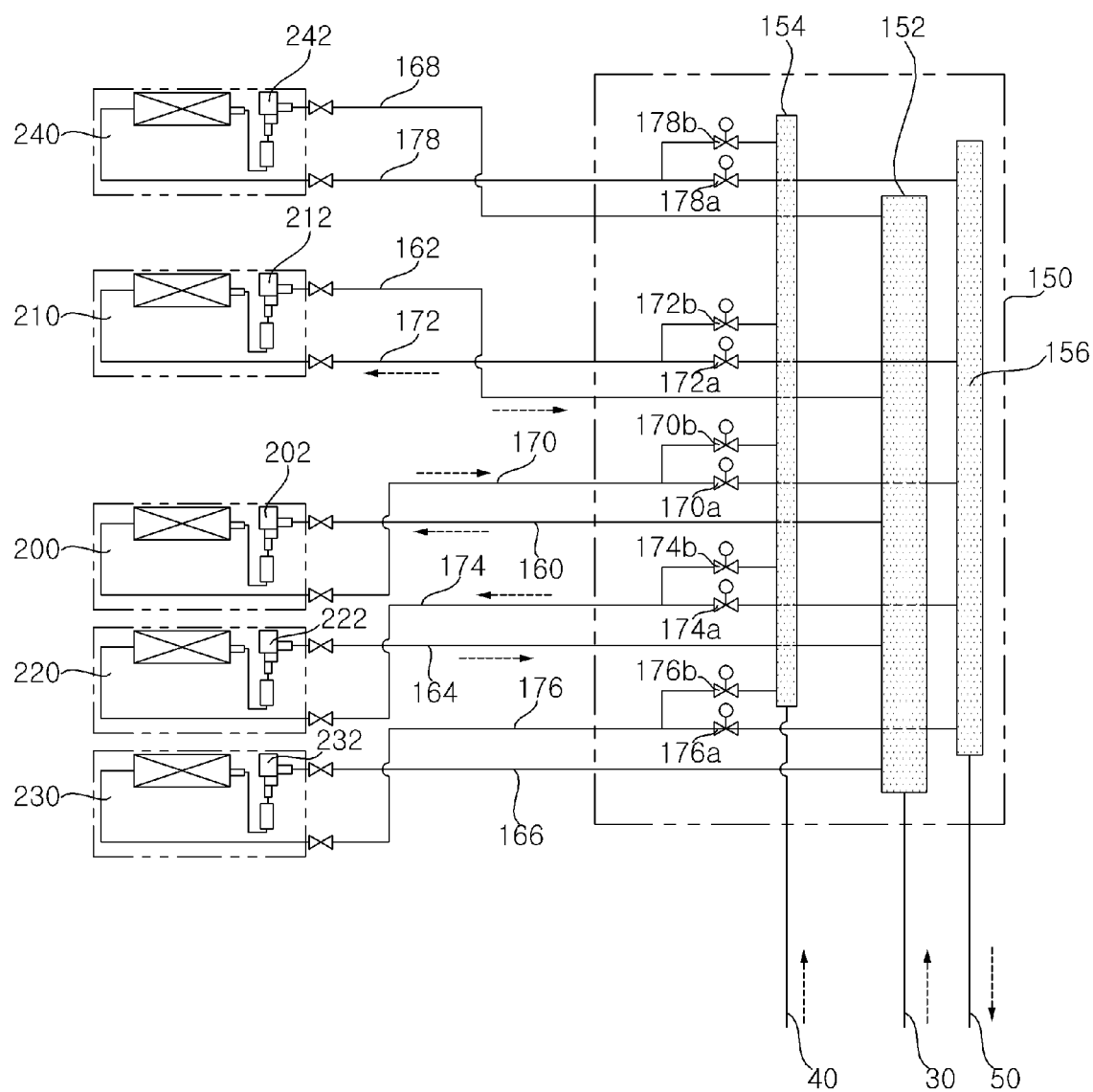
FIG. 5A is a diagram illustrating a flow of a refrigerant when a cooling operation is performed in the system diagram of FIG. 4.

Referring to FIG. 5A, when the air conditioner is in the cooling operation, the main heat exchanger 200 is connected to the liquid refrigerant header 152 and the low-pressure refrigerant header 156, respectively. When the air conditioner is in the cooling operation, the recovery heat exchanger 210 is connected to the high-pressure refrigerant header 154 and the liquid refrigerant header 152, respectively.

When the air conditioner is in the cooling operation, the re-heat heat exchanger 220 is connected to each of the high-pressure refrigerant header 154 and the liquid refrigerant header 152. When the air conditioner is in the cooling operation, in the auxiliary heat exchanger 230, the control valve 176a, 176b disposed in a fourth indoor gas pipe 176 is locked, so that the refrigerant does not flow. When the air conditioner is in the cooling operation, in the preheat heat exchanger 240, the control valve 178a, 178b disposed in a fifth indoor gas pipe 178 is locked, so that the refrigerant does not flow.

When the air conditioner is in the cooling operation, the main heat exchanger 200 cools the air flowing in the supply flow path 120. When the air conditioner is in the cooling operation, the recovery heat exchanger 210 heats the air flowing in the discharge flow path 122. When the air conditioner is in the cooling operation, the re-heat heat exchanger 220 may heat the air flowing in the supply flow path 120.

When the air conditioner is in the cooling operation, the air flowing through the supply flow path 120 is exchanged with indoor air through the total heat exchanger 130. When the air conditioner is in the cooling operation, air flowing through the supply flow path 120 may be cooled primarily by exchanging heat with cold air flowing through the discharge flow path 122.

When the air conditioner is in the cooling operation, the air passed through the total heat exchanger 130 and flowing through the supply flow path 120 passes through the main heat exchanger 200, and is cooled. At this time, condensed water may be generated from the cooled air. When the air conditioner is in the cooling operation, the flowing air that passed through the main heat exchanger 200 may be dried by passing through the re-heat heat exchanger 220. The re-heat heat exchanger 220 has a size smaller than that of the main heat exchanger 200. Since the re-heat heat exchanger 220 has a smaller size than the main heat exchanger 200, and has a smaller amount of heat exchange than the main heat exchanger 200, the air discharged to the outside air supply port 118 may be a cooled and dried air. Accordingly, when the air conditioner is in the cooling, the ventilation device 100 may supply cooled and dried air to the indoor space.

When the air conditioner is in the cooling operation, the air flowing through the discharge flow path 122 is exchanged with the outside air through the total heat exchanger 130. When the air conditioner is in the cooling operation, the air flowing through the discharge flow path 122 may pass through the recovery heat exchanger 210 and be heated.

When the air conditioner is in the cooling operation, the refrigerant discharged from the compressor 12 may be supplied to the high-pressure refrigerant pipe 40 through the first switching valve 18, and may be supplied to the outdoor heat exchanger 14 through the second switching valve 20.

When the air conditioner is in the cooling operation, the refrigerant distributor 150 does not supply the refrigerant to the auxiliary heat exchanger 230. That is, when the air conditioner is in the cooling operation, the auxiliary heat exchanger 230 does not heat the air flowing through the supply flow path.

Figure 5B:
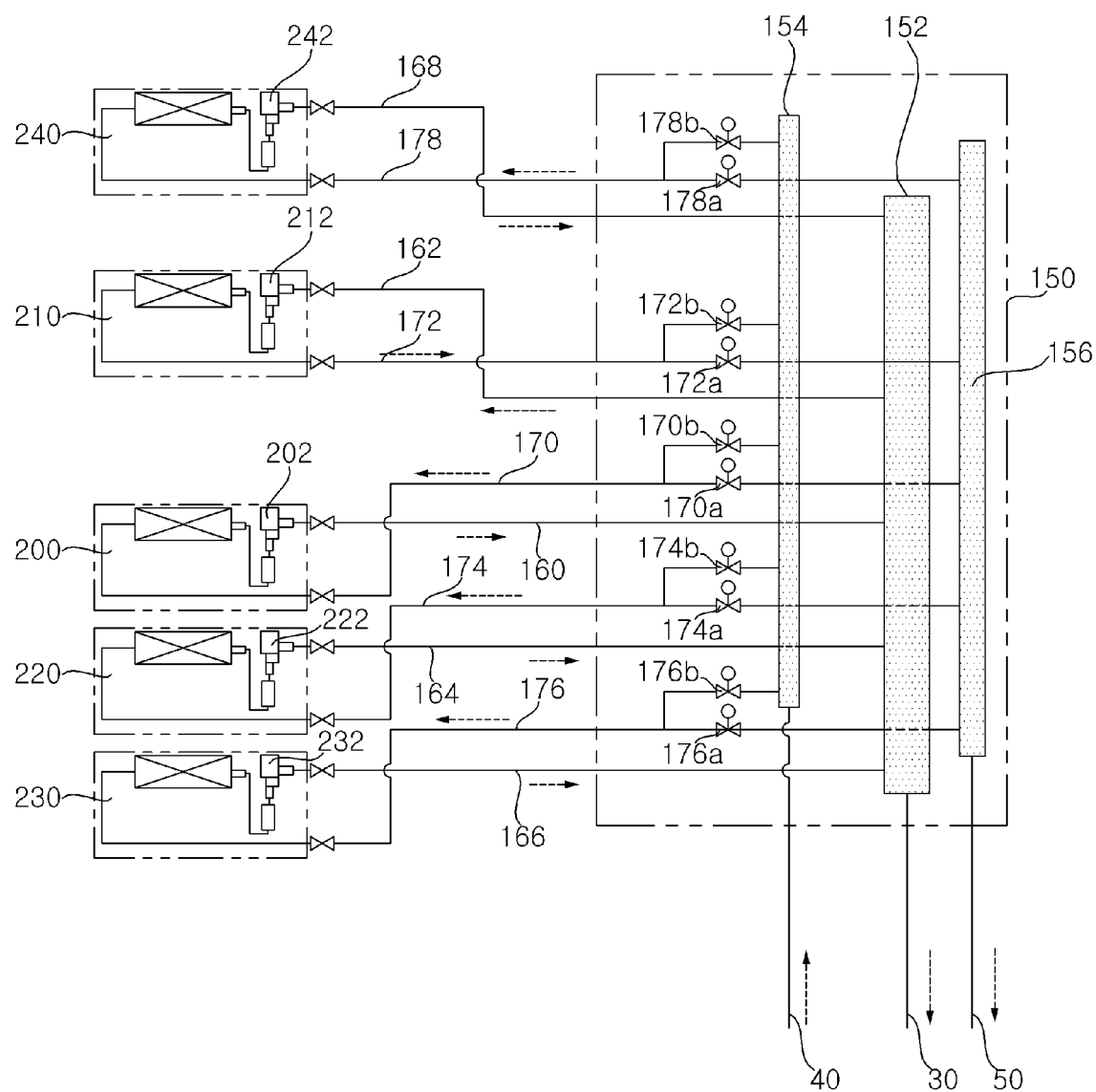
FIG. 5B is a diagram illustrating a flow of a refrigerant when a heating operation is performed in the system diagram of FIG. 4.

Referring to FIG. 5B, when the air conditioner is in the heating operation, the main heat exchanger 200 are connected to the high-pressure refrigerant header 154 and the liquid refrigerant header 152, respectively. When the air conditioner is in the heating operation, the recovery heat exchanger 210 is connected to the liquid refrigerant header 152 and the low-pressure refrigerant header 156, respectively.

When the air conditioner is in the heating operation, the re-heat heat exchanger 220 is connected to the high-pressure refrigerant header 154 and the liquid refrigerant header 152, respectively. When the air conditioner is in the heating operation, the auxiliary heat exchanger 230 may be connected to each of the high-pressure refrigerant header 154 and the liquid refrigerant header 152. When the air conditioner is in the heating operation, the preheat heat exchanger 240 may be connected to each of the high-pressure refrigerant header 154 and the liquid refrigerant header 152.

When the air conditioner is in the heating operation, the main heat exchanger 200 heats the air flowing in the supply flow path 120. When the air conditioner is in the heating operation, the recovery heat exchanger 210 cools the air flowing in the discharge flow path 122. When the air conditioner is in the heating operation, the re-heat heat exchanger 220 may heat the air flowing in the supply flow path 120. When the air conditioner is in the heating operation, the auxiliary heat exchanger 230 may heat the air flowing in the supply flow path 120. When the air conditioner is in the heating operation, the preheat heat exchanger 240 may heat the air sucked into the outside air intake port 116.

When the air conditioner is in the heating operation, the air flowing through the supply flow path 120 passes through the preheat heat exchanger 240 and is primarily preheated. In addition, when the air conditioner is in the heating operation, the air passing through the preheat heat exchanger 240 and flowing through the supply flow path 120 is heat-exchanged with indoor air through the total heat exchanger 130. When the air conditioner is in the heating operation, the air flowing through the supply flow path 120 may heat exchange with warm air flowing through the discharge flow path 122 to be heated primarily.

When the air conditioner is in the heating operation, the air passing through the total heat exchanger 130 and flowing through the supply flow path 120 is heated by passing through the main heat exchanger 200. When the air conditioner is in the heating operation, the air flowing through the main heat exchanger 200 may be heated by passing through the re-heat heat exchanger 220. When the air conditioner is in the heating operation, the air passing and flowing through the re-heat heat exchanger 220 may be heated by passing through the auxiliary heat exchanger 230. The auxiliary heat exchanger 230 may be selectively operated according to a target temperature set by a user.

When the air conditioner is in the heating operation, the air flowing through the discharge flow path 122 is heat-exchanged with the outside air through the total heat exchanger 130. When the air conditioner is in the heating operation, the air flowing through the discharge flow path 122 may be cooled by passing through the recovery heat exchanger 210.

When the air conditioner is in the heating operation, the refrigerant discharged from the compressor 12 is supplied to the high-pressure refrigerant pipe 40 through the first switching valve 18.

According to the air conditioner of the present disclosure, one or more of the following effects are provided.

First, it is possible to control the temperature of the air supplied to the indoor without adding a separate auxiliary heat source, by disposing a plurality of heat exchangers through which refrigerant flows through a single compressor inside the ventilation device that ventilates the indoor air and the outside air, thereby minimizing power consumption.

Second, since a plurality of heat exchangers disposed inside the ventilation device are connected to a refrigerant distributor, each of the plurality of heat exchangers can be simultaneously used as an evaporator or a condenser, thereby maximizing heat exchange efficiency due to a driving of single compressor.

Third, the re-heat heat exchanger and the auxiliary heat exchanger are disposed downstream of the main heat exchanger to control the temperature and humidity of the air discharged into the indoor in detail, thereby providing comfortable air to a user in the indoor space.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   an outdoor unit including a compressor configured to compress a refrigerant and an outdoor heat exchanger configured to exchange heat between the refrigerant and outside air; and
   a ventilation device connected to the outdoor unit through a liquid refrigerant pipe, a high-pressure refrigerant pipe, and a low-pressure refrigerant pipe, and configured to supply the outside air into an indoor space, and discharge indoor air to an outside,
   wherein the ventilation device comprises:
      a case defining a supply flow path through which the outside air is supplied to the indoor space, and a discharge flow path through which the indoor air is discharged to the outside;
      a main heat exchanger disposed in the supply flow path, and configured to exchange heat between air flowing in the supply flow path and the refrigerant;
      a re-heat heat exchanger disposed in the supply flow path, the re-heat heat exchanger being connected to a refrigerant distributor, and configured to heat the air that passed through the main heat exchanger;
      a first blowing fan located downstream from the re-heat heat exchanger in the supply flow path;
      a recovery heat exchanger disposed in the discharge flow path, and configured to exchange heat between air flowing in the discharge flow path and the refrigerant;
      a second blowing fan located downstream from the recovery heat exchanger in the discharge flow path; and
      the refrigerant distributor configured to supply the refrigerant from the outdoor unit to each of the main heat exchanger and the recovery heat exchanger, discharge the refrigerant from each of the main heat exchanger and the recovery heat exchanger to the outdoor unit, and direct the refrigerant between the main heat exchanger and the recovery heat exchanger,
   wherein the refrigerant distributor is disposed in the case and is connected to the outdoor unit through the liquid refrigerant pipe, the high-pressure refrigerant pipe, and the low-pressure refrigerant pipe,
   wherein at least one of the high-pressure refrigerant pipe and the liquid refrigerant pipe is directly connected to the refrigerant distributor,
   wherein the supply flow path connects an outside air intake port through which the outside air flows in, and an outside air supply port through which the outside air is discharged to the indoor space,
   wherein the main heat exchanger, the re-heat heat exchanger, and the first blowing fan are sequentially arranged in the supply flow path, and
   wherein a width of the supply flow path increases from the outside air intake port to the main heat exchanger, and the width of the supply flow path decreases from the main heat exchanger to the re-heat heat exchanger.

2. The air conditioner of claim 1, wherein the recovery heat exchanger is configured to heat the air flowing through the discharge flow path when the main heat exchanger is cooling the air flowing through the supply flow path.

3. The air conditioner of claim 1, wherein the recovery heat exchanger is configured to cool the air flowing through the discharge flow path when the main heat exchanger is heating the air flowing through the supply flow path.

4. The air conditioner of claim 1, wherein the recovery heat exchanger has a smaller heat exchange area than the main heat exchanger.

5. The air conditioner of claim 1, further comprising a total heat exchanger disposed across the supply flow path and the discharge flow path, the total heat exchanger being configured to exchange heat between the air flowing through the supply flow path and the air flowing through the discharge flow path by rotation of the total heat exchanger,
   wherein the recovery heat exchanger is disposed downstream of the total heat exchanger in the discharge flow path.

6. The air conditioner of claim 5, wherein the main heat exchanger is disposed downstream of the total heat exchanger in the supply flow path.

7. The air conditioner of claim 1, wherein the re-heat heat exchanger is disposed downstream of the main heat exchanger in the supply flow path.

8. The air conditioner of claim 1, wherein the re-heat heat exchanger is configured to heat the air flowing through the re-heat heat exchanger based on a desired temperature and relative humidity of the air discharged into the indoor space.

9. The air conditioner of claim 1, wherein the main heat exchanger is configured to cool the air flowing through the main heat exchanger with a dew point temperature corresponding to a set temperature and a set humidity, and wherein the re-heat heat exchanger is configured to heat the air flowing through the re-heat heat exchanger with the set temperature.

10. The air conditioner of claim 1, further comprising an auxiliary heat exchanger disposed in the supply flow path, connected to the refrigerant distributor, and configured to heat the air that passed through the re-heat heat exchanger.

11. The air conditioner of claim 10, wherein the refrigerant distributor is configured to stop a supply of the refrigerant to the auxiliary heat exchanger, when the main heat exchanger cools the air flowing through the supply flow path.

12. The air conditioner of claim 1, wherein the liquid refrigerant pipe is connected to the outdoor heat exchanger disposed inside the outdoor unit,
wherein the high-pressure refrigerant pipe is connected to an output of the compressor and configured to receive the refrigerant compressed by the compressor,
wherein the low-pressure refrigerant pipe is connected to an input of the compressor and configured to supply the refrigerant to the compressor, and
wherein the refrigerant distributor comprises:
a liquid refrigerant header connected to the liquid refrigerant pipe;
a high-pressure refrigerant header connected to the high-pressure refrigerant pipe; and
a low-pressure refrigerant header connected to the low-pressure refrigerant pipe.

13. The air conditioner of claim 12, wherein the refrigerant distributor is configured to supply liquid refrigerant from the liquid refrigerant header to the recovery heat exchanger when the liquid refrigerant is supplied from the main heat exchanger to the liquid refrigerant header, and supply the liquid refrigerant from the liquid refrigerant header to the main heat exchanger when the liquid refrigerant is supplied from the recovery heat exchanger to the liquid refrigerant header.

14. The air conditioner of claim 12, further comprising:
a first indoor gas pipe connecting the main heat exchanger to each of the high-pressure refrigerant header and the low-pressure refrigerant header;
a second indoor gas pipe connecting the recovery heat exchanger to each of the high-pressure refrigerant header and the low-pressure refrigerant header;
a first indoor liquid pipe connecting the main heat exchanger and the liquid refrigerant header; and
a second indoor liquid pipe connecting the recovery heat exchanger and the liquid refrigerant header.

15. The air conditioner of claim 1, further comprising a re-heat heat exchanger disposed in the supply flow path, and directly connected to the high-pressure refrigerant pipe, the re-heat heat exchanger being configured to heat air that has passed through the main heat exchanger.

16. The air conditioner of claim 1, further comprising:
a preheat heat exchanger disposed in the supply flow path and connected to the high-pressure refrigerant pipe, the preheat heat exchanger being configured to heat air flowing through the supply flow path; and
a total heat exchanger in communication with the supply path and the discharge flow path, wherein the re-heat heat exchanger is located downstream from the total heat exchanger in the supply flow path,
wherein the recovery heat exchanger is located downstream from the total heat exchanger in the discharge flow path, and
wherein the preheat heat exchanger is located upstream of the total heat exchanger in the supply flow path.

17. The air conditioner of claim 16, wherein the first blowing fan is located downstream from the re-heat heat exchanger, and
wherein the second blowing fan is located downstream of the recovery heat exchanger.

* * * * *